(12) United States Patent  
Kawamura et al.

(10) Patent No.: US 7,932,940 B2
(45) Date of Patent: Apr. 26, 2011

(54) APPARATUS FOR EDGE ENHANCEMENT AND PEAKING SIGNAL GENERATION BASED ON A TARGET HUE

(75) Inventors: Yoshimasa Kawamura, Shizuoka (JP); Yoshihiro Date, Kanagawa (JP)

(73) Assignee: Sony Corporation (JP)

( * ) Notice: Subject to any disclaimer, the term of this patent is extended or adjusted under 35 U.S.C. 154(b) by 617 days.

(21) Appl. No.: 11/897,075

(22) Filed: Aug. 29, 2007

(65) Prior Publication Data

US 2008/0055435 A1   Mar. 6, 2008

(30) Foreign Application Priority Data

Sep. 4, 2006 (JP) ................. P2006-239044

(51) Int. Cl.
  *H04N 9/64*   (2006.01)
  *H04N 5/208*   (2006.01)
  *H04N 5/228*   (2006.01)
  *H04N 5/21*   (2006.01)
(52) U.S. Cl. ............... 348/253; 348/252; 348/222.1; 348/630
(58) Field of Classification Search .............. 348/253, 348/630
  See application file for complete search history.

(56) References Cited

U.S. PATENT DOCUMENTS

| 4,876,599 | A | * | 10/1989 | Kihara | 348/253 |
| 5,247,352 | A | * | 9/1993 | Nagler et al. | 358/515 |
| 5,274,439 | A | * | 12/1993 | Dischert et al. | 348/645 |
| 5,298,981 | A | * | 3/1994 | Topper et al. | 348/630 |
| 5,376,963 | A | * | 12/1994 | Zortea | 348/222.1 |
| 5,557,340 | A | * | 9/1996 | Millward | 348/627 |
| 5,767,900 | A | * | 6/1998 | Tanji et al. | 348/253 |
| 6,266,088 | B1 | * | 7/2001 | Katoh | 348/253 |
| 2002/0051088 | A1 | * | 5/2002 | Ikeda et al. | 348/630 |
| 2004/0174444 | A1 | * | 9/2004 | Ishii | 348/240.1 |
| 2004/0212700 | A1 | * | 10/2004 | Prabhu et al. | 348/231.99 |
| 2007/0279530 | A1 | * | 12/2007 | Fok | 348/625 |

FOREIGN PATENT DOCUMENTS

| JP | 61-045691 A | 3/1986 |
| JP | 4-100187 A | 4/1992 |
| JP | 7-264399 A | 10/1995 |
| JP | 9-139952 A | 5/1997 |
| JP | 2004-201132 A | 7/2004 |
| JP | 2006-067044 A | 3/2006 |

* cited by examiner

*Primary Examiner* — Lin Ye
*Assistant Examiner* — Chia-Wei A Chen
(74) *Attorney, Agent, or Firm* — Lerner, David, Littenberg, Krumholz & Mentlik, LLP

(57) ABSTRACT

A viewfinder configured to display a captured image includes: an edge correction signal generation unit configured to generate a peaking signal corresponding to an edge enhancement correction target hue that is a hue for which edge enhancement correction will be performed from three primary color signals generated from an input video signal; a signal adding unit configured to add the peaking signal generated by the edge correction signal generation unit to each of the three primary color signals generated from the input video signal; and a driving signal generation unit configured to generate a driving signal for a display device from the three primary color signals to each of which the peaking signal has been added by the signal adding unit.

8 Claims, 4 Drawing Sheets

FIG. 3

| HUE | Y | RED | GREEN | BLUE | CYAN | MAGENTA | YELLOW | ... |
|---|---|---|---|---|---|---|---|---|
| GAIN_R | 0.2126 | 1.000 | 0.000 | 0.000 | 0.000 | 0.500 | 0.500 | ... |
| GAIN_G | 0.7152 | 0.000 | 1.000 | 0.000 | 0.500 | 0.000 | 0.500 | 0.250 |
| GAIN_B | 0.0722 | 0.000 | 0.000 | 1.000 | 0.500 | 0.500 | 0.000 | 0.250 |

GAIN_R + GAIN_G + GAIN_B = 1

APPARATUS FOR EDGE ENHANCEMENT AND PEAKING SIGNAL GENERATION BASED ON A TARGET HUE

CROSS-REFERENCES TO RELATED APPLICATIONS

The present application claims priority from Japanese Patent Application No. JP 2006-239044, filed in the Japanese Patent Office on Sep. 4, 2006, the entire content of which is incorporated herein by reference.

BACKGROUND OF THE INVENTION

1. Field of the Invention

The present invention relates to a viewfinder and an image pickup apparatus which are capable of allowing a user to easily perform focus control.

2. Description of the Related Art

Video cameras for broadcast stations and camcorders display a sharply defined image on a viewfinder by boosting high-frequency components of a captured image so as to allow a user to easily perform focus control. In this case, high-frequency components are extracted from a luminance signal included in a video signal obtained by a video camera and are then amplified so as to generate a peaking signal. The generated peaking signal is added to the video signal. Consequently, a sharply defined image obtained by boosting high-frequency components is generated and is then displayed on a viewfinder, thereby allowing a user to easily perform focus control.

FIG. 4 is a block diagram showing a configuration of an exemplary known viewfinder for displaying such a video image obtained by boosting high-frequency components. This known viewfinder includes a camera section and a viewfinder section. The camera section is provided with the following components that are part of an image pickup apparatus with this known viewfinder: an image pickup lens 51; an image pickup device 52; a video amplifier 53; an A/D conversion unit 54; a digital signal processing unit 55; and a D/A conversion unit 56. The viewfinder section is provided with the following components: a video amplifier 57; a band-pass filter or low-pass filter 58; an A/D conversion unit 59; a matrix unit 60; a peaking signal generation unit 61; a multiplication circuit 62; adding circuits 63, 64, and 65; a display device driving unit 66; and a display device 67.

In the camera section included in the known viewfinder, light incident from a subject via the image pickup lens 51 is separated by the image pickup device 52 into three primary color video signals AR, AG, and AB. The three primary color video signals AR, AG, and AB are amplified by the video amplifier 53 and are then supplied to the A/D conversion unit 54. The A/D conversion unit 54 converts the three primary color video signals AR, AG, and AB into digital video signals DR, DG, and DB, respectively, and outputs the converted signals to the digital signal processing unit 55. The digital signal processing unit 55 performs digital signal processing including matrix processing upon the digital video signals DR, DG, and DB so as to generate a luminance signal DY and color difference signals DU and DV, and outputs the generated signals to the D/A conversion unit 56. The D/A conversion unit 56 converts the digital luminance signal DY and the digital color difference signals DU and DV into an analog luminance signal AY and analog color difference signals AU and AV, respectively. The analog luminance signal AY and the analog color difference signals AU and AV, which have been generated in the camera section, are output to the video amplifier 57 included in the viewfinder section. The video amplifier 57 amplifies the luminance signal AY and the color difference signals AU and AV, and supplies the amplified signals to the low-pass filter 58. The low-pass filter 58 limits the bandwidths of the luminance signal AY and the color difference signals AU and AV to a predetermined bandwidth, and outputs the processed signals to the A/D conversion unit 59. The A/D conversion unit 59 converts the processed luminance signal AY and the processed color difference signals AU and AV into a digital luminance signal DY and digital color difference signals DU and DV, respectively.

The luminance signal DY and the color difference signals DU and DV, which have been converted by the A/D conversion unit 59, are supplied to the matrix unit 60. The matrix unit 60, which is a circuit, generates three primary color video signals DR, DG, and DB from the luminance signal DY and the color difference signals DU and DV, and outputs the generated video signals. The luminance signal DY, which has been converted into a digital signal by the A/D conversion unit 59, is also supplied to the peaking signal generation unit 61, and is then used to generate a peaking signal. The peaking signal generated by the peaking signal generation unit 61 is supplied to the multiplication circuit 62. The multiplication circuit 62 controls the level of the peaking signal by multiplying the peaking signal by a peaking level setting signal. The level-controlled peaking signal is added to the digital video signals DR, DG, and DB, which have been output from the matrix unit 60, by the adding circuits 63, 64, and 65, respectively. The primary color video signals DR, DG, and DB to which the peaking signal has been added are supplied to the display device driving unit 66 as video signals RPK, GPK, and BPK, respectively, which are used to display a sharply defined image obtained by adding the peaking signal. The display device driving unit 66 generates a driving signal for the display device 67, and causes the display device 67 to display, using the video signals RPK, GPK, and BPK, a sharply defined image obtained by adding the peaking signal.

Such a technique for allowing a user to easily perform focus control of a captured image using a peaking signal is disclosed in Japanese Unexamined Patent Application Publication No. 9-139952. More specifically, three primary color signals are generated from a video signal. A peaking signal is added to the three primary color signals. Consequently, edge portions included in a captured image are displayed with a predetermined color. A user can easily perform focus control using the edge portions displayed with the predetermined color.

SUMMARY OF THE INVENTION

In the above-described known viewfinder and image pickup apparatus, a peaking signal is generated by passing the luminance signal DY through a high-pass filter or band-pass filter in the peaking signal generation unit 61. Accordingly, edge portions included in an image, which have been enhanced by the peaking signal, include only information on the difference between levels of luminance components. In a case where there is no difference between levels of luminance components, edge portions are not enhanced even if there is a difference between levels of color components. In addition, in the above-described known viewfinder and image pickup apparatus, peaking processing is performed upon the entire image. Accordingly, peaking processing for enhancing the edge of only a target subject cannot be performed.

It is desirable to provide a viewfinder and an image pickup apparatus which are capable of performing edge enhancement correction upon a subject having a specific hue. Furthermore, it is desirable to provide a viewfinder and an image pickup apparatus which are capable of selectively performing edge enhancement correction upon subjects having various hues. Still furthermore, it is desirable to provide a viewfinder and an image pickup apparatus which are capable of allowing a user to easily perform focus control.

A viewfinder according to an embodiment of the present invention is configured to display a captured image. The viewfinder includes: an edge correction signal generation unit configured to generate a peaking signal corresponding to an edge enhancement correction target hue that is a hue for which edge enhancement correction will be performed from three primary color signals generated from an input video signal; a signal adding unit configured to add the peaking signal generated by the edge correction signal generation unit to each of the three primary color signals generated from the input video signal; and a driving signal generation unit configured to generate a driving signal for a display device from the three primary color signals to each of which the peaking signal has been added by the signal adding unit.

An image pickup apparatus according to an embodiment of the present invention is provided with an image pickup lens that has a focus control function, an image pickup device that generates a video signal from red light, green light, and blue light into which incident light is color-separated and outputs the generated video signal, and a viewfinder. The viewfinder includes: an edge correction signal generation unit configured to generate a peaking signal corresponding to an edge enhancement correction target hue that is a hue for which edge enhancement correction will be performed from three primary color signals generated from an input video signal; a signal adding unit configured to add the peaking signal generated by the edge correction signal generation unit to each of the three primary color signals generated from the input video signal; and a driving signal generation unit configured to generate a driving signal for a display device from the three primary color signals to each of which the peaking signal has been added by the signal adding unit.

A display signal generation circuit according to an embodiment of the present invention is configured to drive a display device. The display signal generation circuit includes: an edge correction signal generation unit configured to generate a peaking signal corresponding to an edge enhancement correction target hue that is a hue for which edge enhancement correction will be performed from three primary color signals generated from an input video signal; a signal adding unit configured to add the peaking signal generated by the edge correction signal generation unit to each of the three primary color signals generated from the input video signal; and a driving signal generation unit configured to generate a driving signal for the display device from the three primary color signals to each of which the peaking signal has been added by the signal adding unit.

According to an embodiment of the present invention, there can be provided a viewfinder and an image pickup apparatus which are capable of performing peaking processing (edge correction) upon a subject having a specific hue. Furthermore, there can be provided a viewfinder and an image pickup apparatus which are capable of selectively performing edge correction upon subjects having various hues. Still furthermore, there can be provided a viewfinder and an image pickup apparatus which are capable of allowing a user to easily perform focus control.

BRIEF DESCRIPTION OF THE DRAWINGS

FIG. 3 is a diagram describing a relationship between hue setting signals, which are used for edge correction of a hue area, and hues.

DESCRIPTION OF THE PREFERRED EMBODIMENTS

Figure 1:
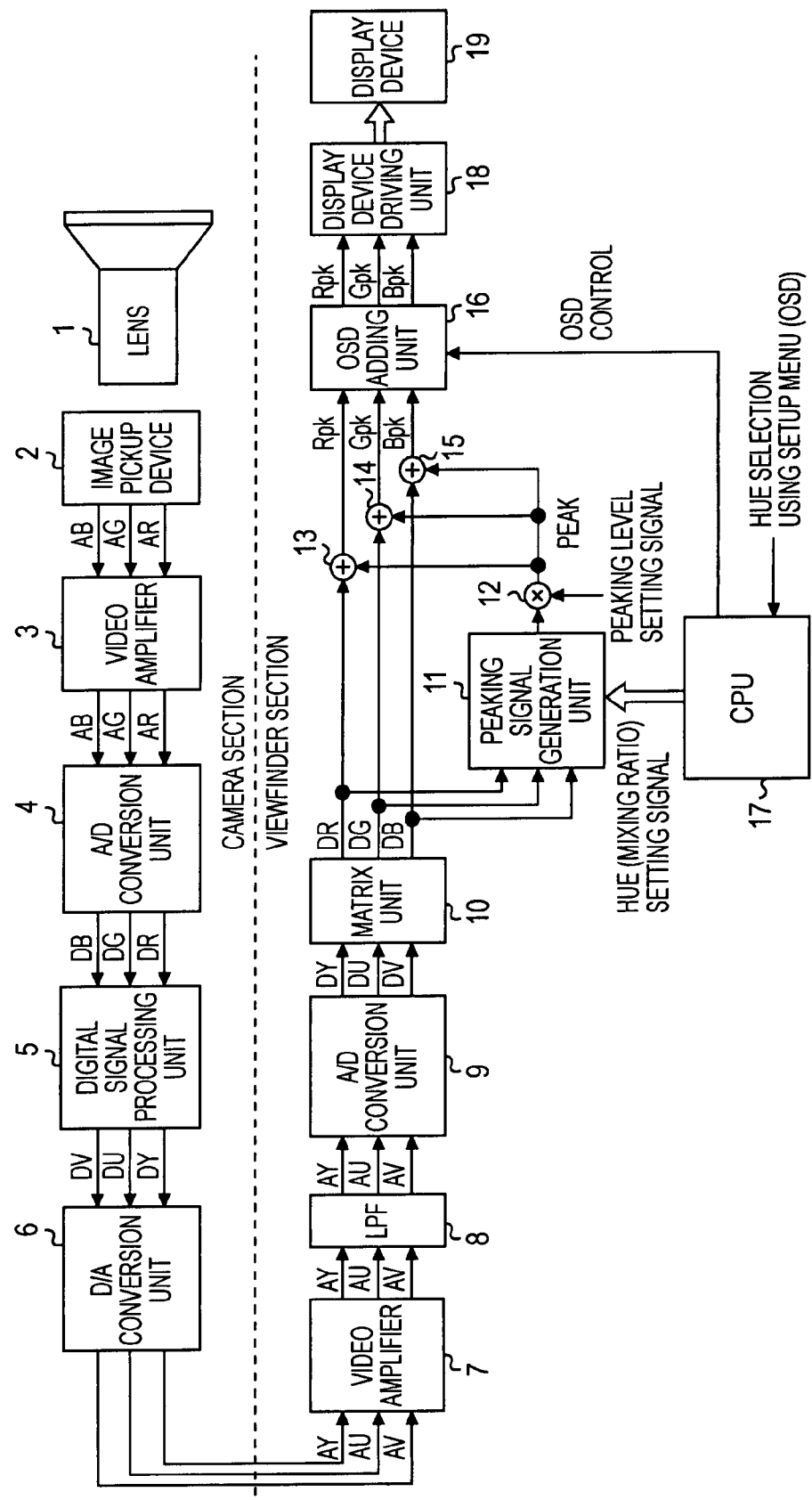
FIG. 1 is a block diagram showing a configuration of a viewfinder according to an embodiment of the present invention and an image pickup apparatus according to an embodiment of the present invention.

FIG. 1 is a block diagram showing a configuration of a viewfinder according to an embodiment of the present invention and an image pickup apparatus according to an embodiment of the present invention. A viewfinder according to an embodiment of the present invention includes a camera section and a viewfinder section. The camera section is provided with the following components that are part of an image pickup apparatus with the viewfinder: an image pickup lens 1; an image pickup device 2; a video amplifier 3; an A/D conversion unit 4; a digital signal processing unit 5; and a D/A conversion unit 6. The viewfinder section is provided with the following components: a video amplifier 7; a band-pass filter or low-pass filter 8; an A/D conversion, unit 9; a matrix unit 10; a peaking signal generation unit (an edge correction signal generation unit) 11; a multiplication circuit (a level setting unit) 12; adding circuits (signal adding units) 13, 14, and 15; an OSD adding unit (a hue selection unit) 16; a CPU (the edge correction signal generation unit and a weighting setting unit) 17; a display device driving unit (a driving signal generation unit) 18; and a display device 19.

The image pickup lens 1 included in the camera section has a controllable focus function, and includes a lens for receiving light incident from a subject and a color separation optical device for separating the light incident from the subject into three primary colors R, G, and B. The image pickup device 2 is, for example, a CCD. The video amplifier 3 is a circuit for amplifying analog video signals AR, AG, and AB, and outputting the amplified signals. The A/D conversion unit 4 is a circuit for converting the received analog video signals AR, AG, and AB into digital video signals DR, DG, and DB, respectively, and outputting the converted signals. The digital signal processing unit 5 is a circuit for performing digital signal processing including matrix processing upon the received digital video signals DR, DG, and DB to generate a luminance signal DY and color difference signals DU and DV, and outputting the generated signals. The D/A conversion unit 6 is a circuit for converting the digital luminance signal DY and the digital color difference signals DU and DV into an analog luminance signal AY and analog color difference signals AU and AV, respectively.

The video amplifier 7 included in the viewfinder section is a circuit for amplifying the analog luminance signal AY and the analog color difference signals AU and AV, and outputting the amplified signals. The low-pass filter 8 is a circuit for limiting the bandwidths of the luminance signal AY and the color difference signals AU and AV to a predetermined bandwidth, and outputting the processed signals. The A/D conversion unit 9 is a circuit for converting the analog luminance signal AY and the analog color difference signals AU and AV into a digital luminance signal DY and digital color difference signals DU and DV, respectively, and outputting the converted signals. The matrix unit 10 is a circuit for converting the luminance signal DY and the color difference signals DU and DV into digital video signals DR, DG, and DB, and outputting the converted signals. The peaking signal generation unit 11 is a circuit for extracting high-frequency components of a predetermined frequency from the digital video signals DR, DG, and DB, generating a peaking (edge correction) signal using the extracted high-frequency components, and outputting the generated peaking (edge correction) signal. The CPU 17 supplies control signals including hue setting signals GAIN_R, GAIN_G, and GAIN_B to the peaking signal generation unit 11.

The multiplication circuit 12 is a circuit for performing peaking (edge correction) level setting upon the peaking signal generated by the peaking signal generation unit 11 using a peaking level setting signal, and outputting the processed peaking (edge correction) signal. For example, the multiplication circuit 12 multiplies the peaking level setting signal, which is used to control the level of a peaking signal, by the peaking signal. The adding circuit 13 is a circuit for adding the peaking signal to the video signal DR, and outputting the processed signal. The adding circuit 14 is a circuit for adding the peaking signal to the video signal DG, and outputting the processed signal. The adding circuit 15 is a circuit for adding the peaking signal to the video signal DB, and outputting the processed signal. The OSD adding unit 16 is a circuit for superimposing upon an image a setup menu screen on which a user's setup operation is performed under the control of an OSD control signal. If a user selects an edge enhancement correction hue area included in a video signal on the setup menu screen superimposed on an image, the selection result is input into the CPU 17. The display device driving unit 18 is a circuit for driving the display device 19 to cause the display device 19 to display an image.

Figure 2:
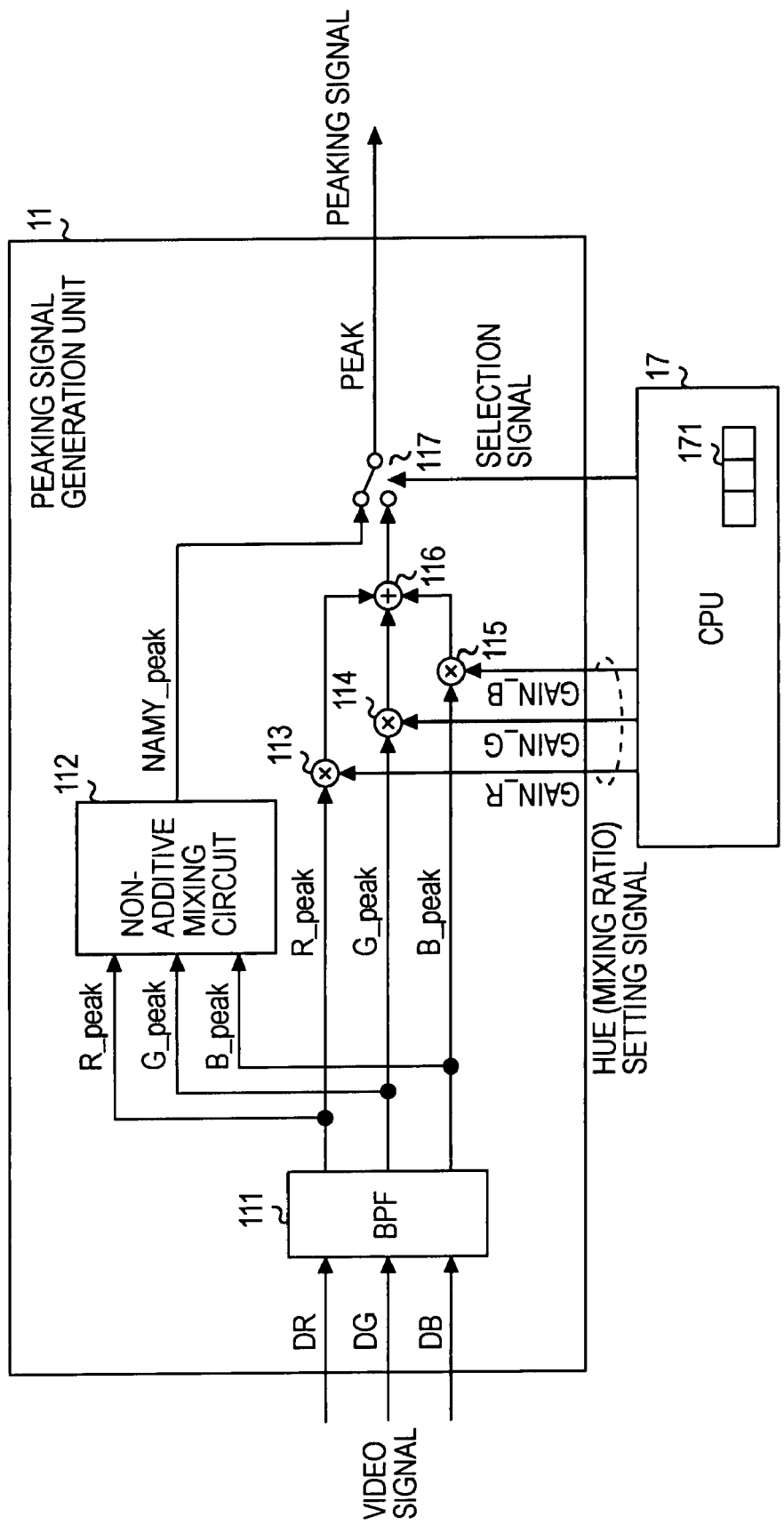
FIG. 2 is a block diagram showing a configuration of a peaking signal generation unit.
Figure 4:
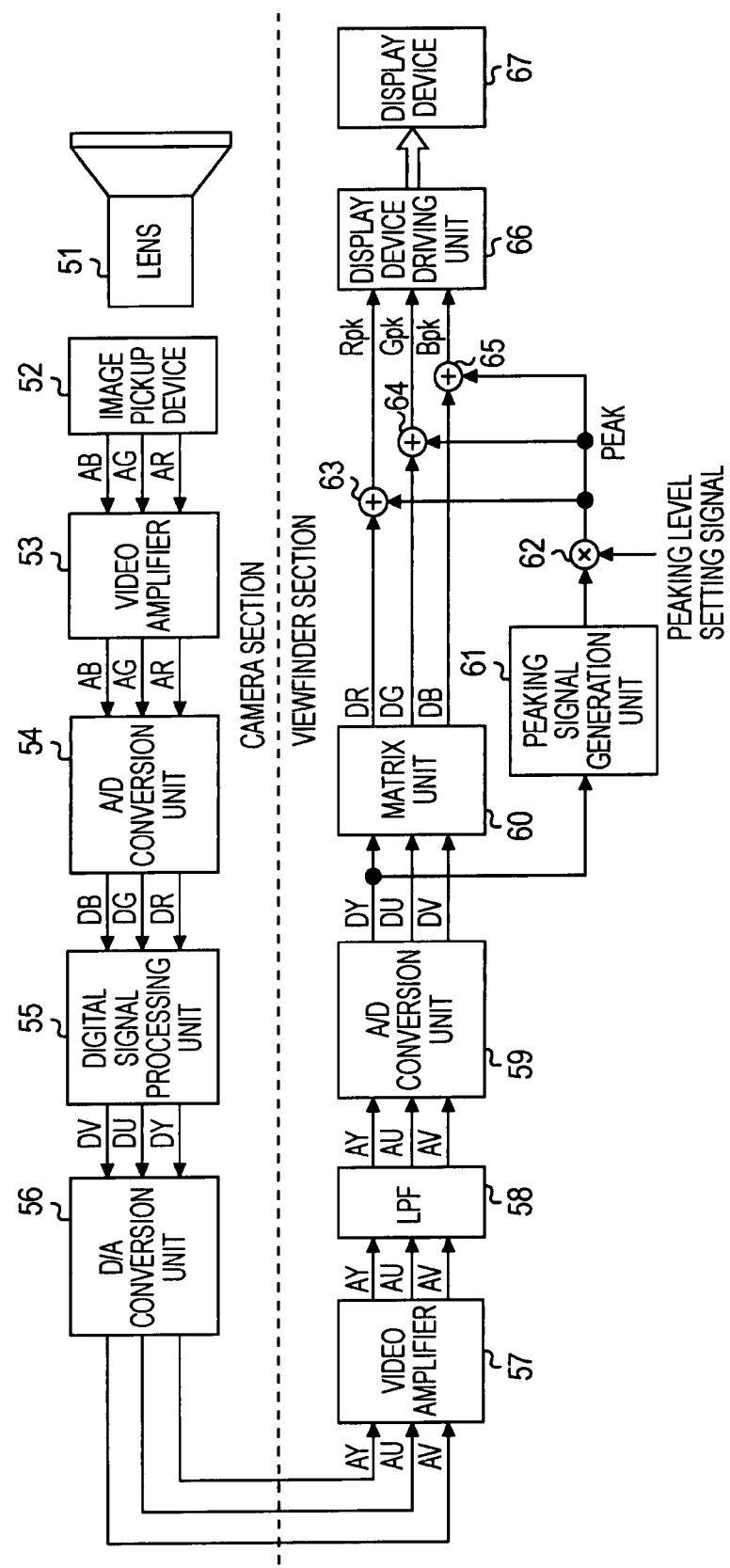
FIG. 4 is a block diagram showing a configuration of a known viewfinder.

FIG. 2 is a circuit diagram showing a configuration of the peaking signal generation unit 11 shown in FIG. 1. As shown in FIG. 2, the peaking signal generation unit 11 is provided with the following components: a band-pass filter (a peaking signal extraction unit) 111; a non-additive mixing circuit (a highest-level peaking signal priority setting unit) 112; multiplication circuits (weighting setting units) 113 114, and 115; an adding circuit (a peaking signal adding unit) 116; and an edge correction function selector switch (a selection unit) 117. The band-pass filter 111 is a filter circuit for extracting high-frequency components of a predetermined frequency from the video signals DR, DG, and DB, and generating peaking (edge correction) signals R_peak, G_peak, and B_peak using the extracted high-frequency components. The non-additive mixing circuit 112 is a circuit for selecting the highest-level peaking (edge correction) signal from among the peaking (edge correction) signals R_peak, G_peak, and B_peak, which have been extracted by the band-pass filter 111, and outputting the highest-level peaking (edge correction) signal as a peaking (edge correction) signal NAMY-_peak.

The multiplication circuit 113 is a circuit for multiplying the hue (mixing ratio) setting signal GAIN_R output from the CPU 17 by the peaking (edge correction) signal R_peak, and outputting the multiplication result to the adding circuit 116. The multiplication circuit 114 is a circuit for multiplying the hue (mixing ratio) setting signal GAIN_G output from the CPU 17 by the peaking (edge correction) signal G_peak, and outputting the multiplication result to the adding circuit 116. The multiplication circuit 115 is a circuit for multiplying the hue (mixing ratio) setting signal GAIN_B output from the CPU 17 by the peaking (edge correction) signal B_peak, and outputting the multiplication result to the adding circuit 116. The adding circuit 116 is a circuit for generating a hue area peaking (edge correction) signal by adding the multiplication results together which have been received from the multiplication circuits 113, 114, and 115. The generated hue area peaking (edge correction) signal is a signal obtained by adding the peaking (edge correction) signals at a certain adding ratio, and is used to perform edge enhancement correction upon a predetermined hue area included in a video signal. The edge correction function selector switch 117 is a switch used to select one of the peaking (edge correction) signal NAMY-_peak output from the non-additive mixing circuit 112 and the hue area peaking (edge correction) signal output from the adding circuit 116. The edge correction function selector switch 117 is configured to be controlled in accordance with a selection signal output from the CPU 17.

FIG. 3 is a diagram describing a relationship between the hue setting signals GAIN_R, GAIN_G, and GAIN_B, which are used for the edge correction of a hue area, and hues. The hue setting signals GAIN_R, GAIN_G, and GAIN_B set an adding ratio of the peaking (edge correction) signals R_peak, G_peak, and B_peak generated from the three primary color R, G, and B signals so as to achieve the edge correction of an area having a hue selected by a user. Accordingly, the following equation GAIN_R+GAIN_G+GAIN_B=1 is derived. That is, edge correction can be performed for various hues by changing the setting of the hue setting signals GAIN_R, GAIN_G, and GAIN_B. However, it is required that the above-described equation GAIN_R+GAIN_G+GAIN_B=1 be satisfied.

Next, the operations of a viewfinder according to an embodiment of the present invention and an image pickup apparatus according to an embodiment of the present invention will be described. In the camera section included in a viewfinder according to an embodiment of the present invention, light incident from a subject via the image pickup lens 1 is color-separated. The image pickup device 2 generates the three primary color video signals AR, AG, and AB. The three primary color video signals AR, AG, and AB are amplified by the video amplifier 3 and are then supplied to the A/D conversion unit 4. The A/D conversion unit 4 converts the three primary color video signals AR, AG, and AB into the digital video signals DR, DG, and DB, respectively, and outputs the converted signals to the digital signal processing unit 5. The digital signal processing unit 5 performs digital signal processing including matrix processing upon the video signals DR, DG, and DB so as to generate the luminance signal DY and the color difference signals DU and DV, and outputs the generated signals to the D/A conversion unit 6. The D/A conversion unit 6 converts the luminance signal DY and the color difference signals DU and DV into the analog luminance signal AY and the analog color difference signals AU and AV, respectively.

The analog luminance signal AY and the analog color difference signals AU and AV, which have been generated in the camera section, are output to the video amplifier 7 included in the viewfinder section. The video amplifier 7 amplifies the analog luminance signal AY and the analog color difference signals AU and AV, and outputs the amplified signals to the low-pass filter 8. The low-pass filter 8 limits the bandwidths of the analog luminance signal AY and the analog color difference signals AU and AV to a predetermined bandwidth, and outputs the processed signals to the A/D conversion unit 9. The A/D conversion unit 9 converts the analog luminance signal AY and the analog color difference signals AU and AV into the digital luminance signal DY and the digital color difference signals DU and DV, respectively, and outputs the converted signals to the matrix unit 10. The matrix unit 10 converts the luminance signal DY and the color difference signals DU and DV into the digital video signals DR, DG, and DB, and outputs the video signals DR, DG, and DB to the adding circuits 13, 14, and 15, respectively. Furthermore, the matrix unit 10 also outputs the video signals DR, DG, and DB to the peaking signal generation unit 11.

The peaking signal generation unit 11 generates a peaking signal corresponding to an edge enhancement correction target hue from the digital video signals DR, DG, and DB using the hue (mixing ratio) setting signals supplied from the CPU 17. The peaking signal generated by the peaking signal generation unit 11 is output to the multiplication circuit 12, and is then multiplied by a peaking level setting signal therein. As a result, the peaking level of the peaking signal is controlled. The peaking-level-controlled peaking signal is added to the digital video signals DR, DG, and DB, which have been output from the matrix unit 10, by the adding circuits 13, 14, and 15, respectively. The addition results are output to the OSD adding unit 16 as the video signals Rpk, Gpk, and Bpk.

The OSD adding unit 16 allows a user to select a hue for which peaking (edge correction) will be performed under the control of the OSD control signal output from the CPU 17. More specifically, in the OSD adding unit 16, a user can select a hue for which peaking (edge correction) will be performed on a setup menu that has been superimposed on the obtained image in accordance with the OSD control signal. The hue selection result is input into the CPU 17. The CPU 17 sets an adding ratio of the peaking (edge correction) signals, which have been generated from the three primary color R, G, and B signals, on the basis of the hue selection result. For example, the CPU 17 sets the adding ratio using the hue setting signals GAIN_R, GAIN_G, and GAIN_B as shown in FIG. 3 by way of example, and sets the adding ratio for an edge correction signal generation unit (a weighting setting unit) 171 such as a register. Thus, user's hue selection is achieved.

Subsequently, in the peaking signal generation unit 11 shown in FIG. 2, the multiplication circuit 113 multiplies the hue (mixing ratio) setting signal GAIN_R output from the CPU 17 by the peaking (edge correction) signal R_peak, and outputs the multiplication result to the adding circuit 116. The multiplication circuit 114 multiplies the hue (mixing ratio) setting signal GAIN_G output from the CPU 17 by the peaking (edge correction) signal G_peak, and outputs the multiplication result to the adding circuit 116. The multiplication circuit 115 multiplies the hue (mixing ratio) setting signal GAIN_B output from the CPU 17 by the peaking (edge correction) signal B_peak, and outputs the multiplication result to the adding circuit 116. The adding circuit 116 adds the multiplication results together which have been output from the multiplication circuits 113, 114, and 115, thereby generating the hue area peaking (edge correction) signal used for the edge enhancement correction of a predetermined hue area included in the video signal. That is, the hue area peaking (edge correction) signal is obtained by adding the peaking (edge correction) signals at an adding ratio that has been determined on the basis of the hue setting signals GAIN_R, GAIN_G, and GAIN_B. The generated hue area peaking (edge correction) signal is output from the adding circuit 116. At that time, if the edge correction function selector switch 117 is closed on the side of the adding circuit 116 in accordance with the selection signal transmitted from the CPU 17, this hue area peaking (edge correction) signal is output from the peaking signal generation unit 11 to the multiplication circuit 12, and is then multiplied by the peaking level setting signal therein for peaking level control. Subsequently, the hue area peaking (edge correction) signal, whose peaking level has been controlled by the peaking level setting signal, is added to the video signals DR, DG, and DB by the adding circuits 13, 14, and 15, respectively. The addition results are supplied to the display device driving unit 18 as the video signals Rpk, Gpk, and Bpk used for the edge enhancement correction of a predetermined hue area. The display device driving unit 18 generates a driving signal for the display device 19, performs edge enhancement correction upon a predetermined hue area using the video signals Rpk, Gpk, and Bpk, and causes the display device 19 to display an image in which the edge portion of a predetermined hue area has been enhanced by peaking processing (edge correction).

On the other hand, if the edge correction function selector switch 117 is closed on the side of the non-additive mixing circuit 112 in accordance with the selection signal transmitted from the CPU 17, the highest-level peaking (edge correction) signal is automatically selected from among the peaking (edge correction) signals R_peak, G_peak, and B_peak extracted by the band-pass filter 111, and is then output as the peaking (edge correction) signal NAMY_peak from non-additive mixing circuit 112. In this case, an operator is not required to select a hue for which peaking (edge correction) will be performed. Thus, the workload of an operator can be reduced.

Next, an exemplary case will be described in which, even if there is no difference between luminance levels in a subject, the edge correction can be performed by detecting a difference between levels of three primary color signals. The signal standard for the HD1080 system defines a luminance level as follows: $Y=0.2126 \times Rch + 0.7152 \times Gch + 0.0722 \times Bch$. Here, it is assumed that there are two signals compliant with this signal standard, a first signal and a second signal, and the levels of three primary color signals generated from the first signal are $Rch=1/(0.2126 \times 3)$, $Gch=1/(0.7152 \times 3)$, and $Bch=1/(0.0722 \times 3)$, and the levels of three primary color signals generated from the second signal are $Rch=0$, $Gch=1/(0.7152)$, and $Bch=0$. In known methods, an edge correction signal is generated from luminance signals (Y). In this case, since both of luminance levels of the first and second signals become $Y=1$, it is determined that there is no difference between luminance levels of the first and second signals and edge correction is not performed. On the other hand, in this embodiment, for example, edge correction for a green hue can be achieved by setting the hue setting signals as follows: $GAIN\_R=0$, $GAIN\_G=1$, and $GAIN\_B=0$. Thus, by selecting an adding ratio of the edge correction signals, which have been generated from the three primary color signals, from among alternatives included in the example shown in FIG. 3 on the basis of a hue of a focusing target subject, the edge enhancement correction of the target subject can be performed. Here, if edge correction is performed using luminance components (Y) in the same manner as known methods, the hue setting signals GAIN_R, GAIN_G, and GAIN_B are required to be set in accordance with an adding ratio compliant with a standard as shown in FIG. 3.

As described previously, high-frequency components of a predetermined frequency are detected from three primary color signals generated from an input video signal so as to generate peaking (edge correction) signals. By setting an adding ratio of the peaking (edge correction) signals generated from the three primary color signals, edge enhancement correction can be performed upon a predetermined hue area included in the input video signal. Accordingly, according to an embodiment of the present invention, peaking processing (edge correction) can be performed upon a subject having a specific hue. Consequently, focus control of the subject having the specific hue can be easily performed. Still furthermore, edge correction can be selectively performed upon subjects having various hues. Consequently, focus control of a subject having a selected specific hue can be easily performed. Furthermore, as is different from known methods in which a peaking (edge correction) signal is generated from luminance signals, a peaking signal is generated using the three primary color signals, which have been generated from the input video signal, in accordance with a hue for which edge enhancement correction will be performed. Accordingly, even if a subject has no luminance level difference, edge correction can be performed by detecting a difference between levels of the three primary color signals.

It should be understood by those skilled in the art that various modifications, combinations, sub-combinations and alterations may occur depending on design requirements and other factors insofar as they are within the scope of the appended claims or the equivalents thereof.

What is claimed is:

1. A viewfinder configured to display a captured image, comprising:
   hue selection means for enabling a user to select an edge enhancement correction target hue;
   edge correction signal generating means for generating a peaking signal from three primary color signals generated from an input video signal;
   signal adding means for adding the peaking signal generated by the edge correction signal generating means to each of the three primary color signals generated from the input video signal; and
   driving signal generating means for generating a driving signal for a display device from the three primary color signals to each of which the peaking signal has been added by the signal adding means,
   the edge correction signal generating means having:
   peaking signal extracting means for extracting peaking signals from the three primary color signals generated from the input video signal by detecting high-frequency components from the three primary color signals,
   weighting setting means for assigning weights to each of the peaking signals extracted from the three primary color signals by the peaking signal extracting means on the basis of the edge enhancement correction target hue selected by the user,
   peaking signal adding means for adding the weighted peaking signals from the weighting setting means together to generate the peaking signal corresponding to the edge enhancement correction target hue,
   highest-level peaking signal priority setting means for selecting a highest-level peaking signal from among the peaking signals extracted from the three primary color signals by the peaking signal extracting means, and outputting the selected highest-level peaking signal, and
   selecting means for selecting one of the peaking signal out from the highest-level peaking signal priority setting means and the peaking signal generated by the peaking signal adding means in accordance with a selection signal,
   in which when the selecting means is operated to select the peaking signal out from the highest-level peaking signal priority setting means, the user does not need to select the edge enhancement correction target hue.

2. The viewfinder according to claim 1, further comprising level setting means for setting a level of the peaking signal generated by the edge correction signal generating means.

3. An image pickup apparatus provided with an image pickup lens that has a focus control function, an image pickup device that generates a video signal from red light, green light, and blue light into which incident light is color-separated and outputs the generated video signal, and a viewfinder, the viewfinder comprising:
   hue selection means for enabling a user to select an edge enhancement correction target hue;
   edge correction signal generating means for generating a peaking signal from three primary color signals generated from an input video signal;
   signal adding means for adding the peaking signal generated by the edge correction signal generating means to each of the three primary color signals generated from the input video signal; and
   driving signal generating means for generating a driving signal for a display device from the three primary color signals to each of which the peaking signal has been added by the signal adding means,
   the edge correction signal generating means having:
   peaking signal extracting means for extracting peaking signals from the three primary color signals generated from the input video signal by detecting high-frequency components from the three primary color signals,
   weighting setting means for assigning weights to each of the peaking signals extracted from the three primary color signals by the peaking signal extracting means on the basis of the edge enhancement correction target hue selected by the user,
   peaking signal adding means for adding the weighted peaking signals from the weighting setting means together to generate the peaking signal corresponding to the edge enhancement correction target hue,
   highest-level peaking signal priority setting means for selecting a highest-level peaking signal from among the peaking signals extracted from the three primary color signals by the peaking signal extracting means, and outputting the selected highest-level peaking signal, and
   selecting means for selecting one of the peaking signal output from the highest-level peaking signal priority setting means and the peaking signal generated by the peaking signal adding means in accordance with a selection signal,
   in which when the selecting means is operated to select the peaking signal output from the highest-level peaking signal priority setting means, the user does not need to select the edge enhancement correction target hue.

4. The image pickup apparatus according to claim 3, wherein the viewfinder includes level setting means for setting a level of the peaking signal generated by the edge correction signal generating means.

5. A display signal generation circuit configured to drive a display device, comprising:
   hue selection means for enabling a user to select an edge enhancement correction target hue;
   edge correction signal generating means for generating a peaking signal from three primary color signals generated from an input video signal;
   signal adding means for adding the peaking signal generated by the edge correction signal generating means to each of the three primary color signals generated from the input video signal; and
   driving signal generating means for generating a driving signal for the display device from the three primary color signals to each of which the peaking signal has been added by the signal adding means,
   the edge correction signal generating means having:
   peaking signal extracting means for extracting peaking signals from the three primary color signals generated from the input video signal by detecting high-frequency components from the three primary color signals,
   weighting setting means for assigning weights to each of the peaking signals extracted from the three primary color signals by peaking signal extracting means on the basis of the edge enhancement correction target hue selected by the user, peaking signal adding means for adding the weighted peaking signals from the weighting setting means together to generate the peaking signal corresponding to the edge enhancement correction target hue, highest-level peaking signal priority setting means for selecting a highest-level peaking signal from among the peaking signals extracted from the three primary color signals by the peaking signal extracting means, and outputting the selected highest-level peaking signal, and selecting means for selecting one of the peaking signal output from the highest-level peaking signal priority setting means and the peaking signal generated by the peaking signal adding means in accordance with a selection signal, in which when the selecting means is operated to select the peaking signal output from the highest-level peaking signal priority setting means, the user does not need to select the edge enhancement correction target hue.

6. A viewfinder configured to display a captured image comprising:

a hue selection unit configured to enable a user to select an edge enhancement correction target hue;

an edge correction signal generation unit configured to generate a peaking signal from three primary color signals generated from an input video signal;

a signal adding unit configured to add the peaking signal generated by the edge correction signal generation unit to each of the three primary color signals generated from the input video signal; and a driving signal generation unit configured to generate a driving signal for a display device from the three primary color signals to each of which the peaking signal has been added by the signal adding unit, the edge correction signal generating unit having:

a peaking signal extracting unit configured to extract peaking signals from the three primary color signals generated from the input video signal by detecting high-frequency components from the three primary color signals, a weighting setting unit configured to assign weights to each of the peaking signals extracted from the three primary color signals by the peaking signal extracting unit on the basis of the edge enhance correction target hue selected by the user, a peaking signal adding unit configured to add the weighted peaking signals from the weighting setting unit together to generate the peaking signal corresponding to the edge enhancement correction target hue, a highest-level peaking signal priority setting unit configured to select a highest-level peaking signal from among the peaking signals extracted from the three primary color signals by the peaking signal extracting unit, and outputting the selected highest-level peaking signal, and a selecting unit configured to select one of the peaking signal output from the highest-level peaking signal priority setting means and the peaking signal generated by the peaking signal adding unit in accordance with a selection signal, in which when the selecting unit is operated to select the peaking signal output from the highest-level peaking signal priority setting unit, the user does not need to select the edge enhancement correction target hue.

7. An image pickup apparatus provided with an image pickup lens that has a focus control function, an image pickup device that generates a video signal from red light, green light, and blue light into which incident light is color-separated and outputs the generated video signal, and a viewfinder, the viewfinder comprising:

a hue selection unit configured to enable a user to select an edge enhancement correction target hue;

an edge correction signal generation unit configured to generate a peaking signal from three primary color signals generated from an input video signal;

a signal adding unit configured to add the peaking signal generated by the edge correction signal generation unit to each of the three primary color signals generated from the input video signal; and a driving signal generation unit configured to generate a driving signal for a display device from the three primary color signals to each of which the peaking signal has been added by the signal adding unit, the edge correction signal generating unit having:

a peaking signal extracting unit configured to extract peaking signals from the three primary color signals generated from the input video signal by detecting high-frequency components from the three primary color signals, a weighting setting unit configured to assign weights to each of the peaking signals extracted from the three primary color signals by the peaking signal extracting unit on the basis of the edge enhancement correction target hue selected by the user, a peaking signal adding unit configured to add the weighted peaking signals from the weighting setting unit together to generate the peaking signal corresponding to the edge enhancement correction target hue, a highest-level peaking signal priority setting unit configured to select a highest-level peaking signal from among the peaking signals extracted from the three primary color signals by the peaking signal extracting unit, and outputting the selected highest-level peaking signal, and a selecting unit configured to select one of the peaking signal output from the highest-level peaking signal priority setting means and the peaking signal generated by the peaking signal adding unit in accordance with a selection signal, in which when the selecting unit is operated to select the peaking signal output from the highest-level peaking signal priority setting unit, the user does not need to select the edge enhancement correction target hue.

8. A display signal generation circuit configured to drive a display device, comprising:

a hue selection unit configured to enable a user to select an edge enhancement correction target hue;

an edge correction signal generation unit configured to generate a peaking signal from three primary color signals generated from an input video signal;

a signal adding unit configured to add the peaking signal generated by the edge correction signal generation unit to each of the three primary color signals generated from the input video signal; and a driving signal generation unit configured to generate a driving signal for the display device from the three primary color signals to each of which the peaking signal has been added by the signal adding unit, the edge correction signal generating unit having:

a peaking signal extracting unit configured to extract peaking signals from the three primary color signals generated from the input video signal by detecting high-frequency components from the three primary color signals, a weighting setting unit configured to assign weights to each of the peaking signals extracted from the three primary color signals by peaking signal extracting unit on the basis of the edge enhancement correction target hue selected by the user, a peaking signal adding unit configured to add the weighted peaking signals from the weighting setting unit together to generate the peaking signal corresponding to the edge enhancement correction target hue, a highest-level peaking signal priority setting unit configured to select a highest-level peaking signal from among the peaking signals extracted from the three primary color signals by the peaking signal extracting unit, and outputting the selected highest-level peaking signal, and a selecting unit configured to select one of the peaking signal output from the highest-level peaking signal priority setting means and the peaking signal generated by the peaking signal adding unit in accordance with a selection signal, in which when the selecting unit is operated to select the peaking signal output from the highest-level peaking signal priority setting unit, the user does not need to select the edge enhancement correction target hue.

* * * * *